US006722445B2

(12) United States Patent
Ohta et al.

(10) Patent No.: US 6,722,445 B2
(45) Date of Patent: Apr. 20, 2004

(54) WORKING MACHINE HAVING FRONT-ROTARY WORKING UNIT

(75) Inventors: Yoshitaka Ohta, Wako (JP); Hideaki Kobayashi, Wako (JP); Masatoshi Nagaoka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/339,073

(22) Filed: Jan. 9, 2003

(65) Prior Publication Data

US 2003/0132011 A1 Jul. 17, 2003

(30) Foreign Application Priority Data

Jan. 16, 2002 (JP) ........................ 2002-008023
Jan. 16, 2002 (JP) ........................ 2002-008041

(51) Int. Cl.[7] .............................................. A01B 33/00
(52) U.S. Cl. ................... 172/42; 172/125; 172/256; 172/351
(58) Field of Search ................ 172/42, 46, 48, 172/351, 107, 114, 118, 125, 256; 74/84 R, 89.14, 89.16

(56) References Cited

U.S. PATENT DOCUMENTS

| 2,998,082 | A | * | 8/1961 | Arnot ........................ 172/42 |
| 4,208,923 | A | * | 6/1980 | Ikegami ..................... 74/15.63 |
| 4,354,564 | A | * | 10/1982 | Watanabe et al. .......... 180/19.1 |
| 4,519,459 | A | * | 5/1985 | Reaume ....................... 172/42 |
| 4,567,949 | A | * | 2/1986 | Herscher ..................... 172/42 |
| 4,640,366 | A | * | 2/1987 | Saito .......................... 172/42 |
| 4,699,219 | A | * | 10/1987 | Durrant et al. ............... 172/42 |
| 4,760,758 | A | * | 8/1988 | Murayama ................. 475/143 |
| 4,838,357 | A | * | 6/1989 | Adachi et al. ................ 172/43 |
| 4,856,264 | A | * | 8/1989 | Nishimura et al. .......... 56/10.9 |
| 4,895,210 | A | * | 1/1990 | Witzel ....................... 172/256 |
| 4,982,799 | A | * | 1/1991 | Fujimoto et al. .............. 172/2 |
| 5,320,451 | A | * | 6/1994 | Garvey et al. .............. 405/181 |
| 5,896,931 | A | * | 4/1999 | Roberts et al. ............... 172/42 |
| 6,470,766 | B2 | * | 10/2002 | Ohta et al. .................... 74/425 |
| 6,488,101 | B1 | * | 12/2002 | Miyahara et al. ............. 172/46 |
| 6,516,542 | B2 | * | 2/2003 | McClure ................... 37/142.5 |

FOREIGN PATENT DOCUMENTS

FR          2689363        10/1993

* cited by examiner

*Primary Examiner*—Victor Batson
(74) *Attorney, Agent, or Firm*—Adams & Wilks

(57) ABSTRACT

Front-rotary working machine employs a vertical engine having an output shaft projecting downward, and a transmission case, provided beneath the vertical engine, has a flat underside so as to extend generally parallel to the ground surface to be cultivated. Distance between left and right transporting wheels, connected to a driving shaft at a rear end portion of the transmission case, can be reduced as necessary. With these arrangements, it is possible to reduce the overall width of the front-rotary working machine.

17 Claims, 14 Drawing Sheets

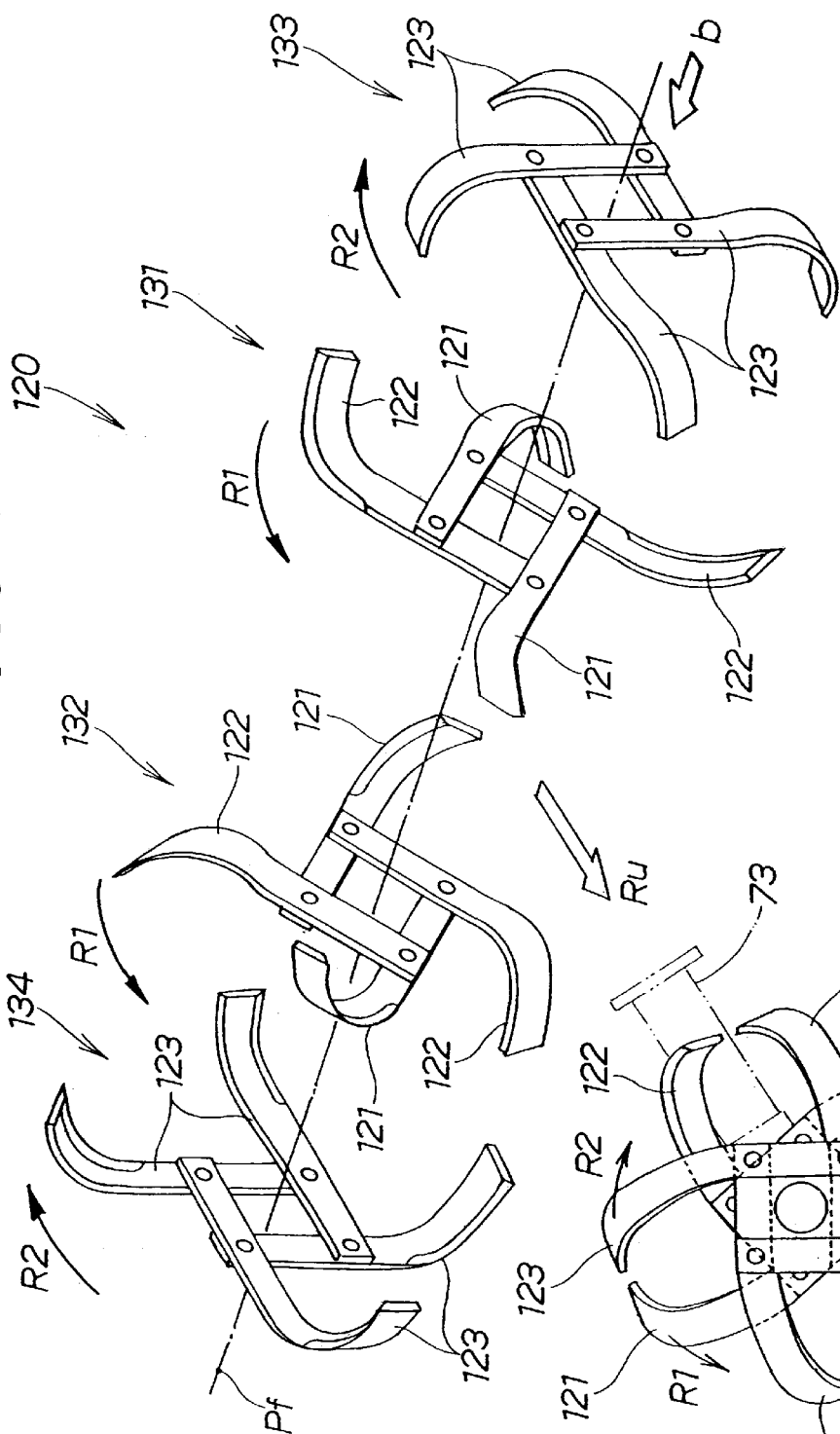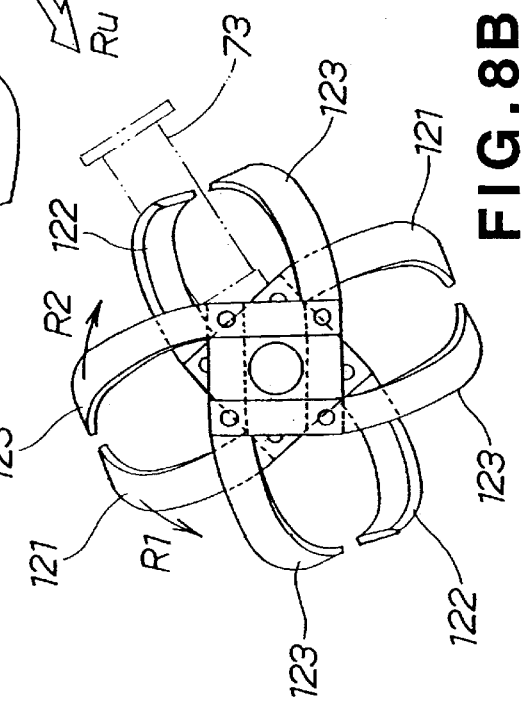

WORKING MACHINE HAVING FRONT-ROTARY WORKING UNIT

FIELD OF THE INVENTION

The present invention relates to an improvement in front-rotary working machines.

BACKGROUND OF THE INVENTION

Among popular walking-type working machines are cultivators which, though rotations of cultivating claws mounted on a cultivating shaft assembly, not only cultivate the ground but also travel in a direction instructed by a human operator; such machines are commonly called "front-tine working machines". In recent years, development of so-called "front-rotary working machines" has been proceeding, which are walking-type working machines that include cultivating claws in front of a machine body having transporting wheels mounted thereon. Such front-rotary working machines can readily cultivate on machine-turning areas (also known as butts) of a field because the cultivating claws are disposed in front of the machine body, and achieve superior operability because the human operator can operate the machine while looking ahead. Because of these advantages, the front-rotary working machines have been attracting people's attention.

Note that the "machine-turning areas" or "butts" are dead or temporarily uncultivated areas that are produced at opposite ends of a field by temporary stoppage of cultivating operations due to U-turn motions of the working machine, for example, in a case where the machine cultivates the field while reciprocating parallel to one side of the field.

Among examples of such front-rotary working machines is an "Agricultural Working Machine" disclosed in Japanese Patent Publication No. 3,015,821. The disclosed agricultural working machine (hereinafter also referred to as a conventional front-rotary working machine) is of a so-called "down-cut" type which is designed to cultivate the ground by rotating the cultivating shaft assembly, and hence the cultivating claws, downwardly to the ground and which is used primarily for plowing. The conventional front-rotary working machine will be outlined below.

FIG. 16 is a schematic view of the conventional front-rotary working machine. The conventional front-rotary working machine 200 is a walking-type cultivator which includes an engine 201 mounted on a machine body 202, and a power transmission casing 203 provided beneath the machine body 202. The power transmission casing 203 includes a rear transmission case 204 and front rotary case 205 that are formed as a one-piece or integral unit. A pair of left and right transporting wheels 207 are mounted at both ends of an axle 206 projecting from opposite sides of a rear portion of the transmission case 204, and a rotary-side intermediate shaft 208 is disposed on a front portion of the rear transmission case 204. The conventional front-rotary working machine also includes a cultivating shaft assembly 209 having a plurality of cultivating claws 210 provided thereon. Within the front rotary case 205, an endless chain 213 is wound on and extends between a driving sprocket 211 mounted on the rotary-side intermediate shaft 208 and a driven sprocket 212 mounted on the cultivating shaft assembly 209.

The engine 201 employed in the conventional front-rotary working machine 200 is a horizontal engine having an output shaft 214 projecting laterally outwardly therefrom. With a belt 218 wound on and extending between a driving pulley 215 mounted on the output shaft 214 and a driven pulley 217 mounted on an input shaft 216 projecting sideways from the transmission case 204, output power of the engine 201 can be transmitted to the transmission system. Namely, a belt transmission mechanism 221 for transmitting the power from the engine 201 to the transmission system is composed of the driving pulley 215 mounted on the output shaft 214 extending horizontally widthwise of the machine 200, driven pulley 217 mounted on the input shaft 216 also extending horizontally widthwise of the machine 200 and belt 218 wound on the driving pulley 215 and driven pulley 217. The belt transmission mechanism 221 can be activated or deactivated via a tension roller 219 functioning as a main clutch mechanism. Namely, power transmission by the belt transmission mechanism 221 can be enabled by tightening the belt 218 via the tension roller 219 and disabled by loosening the belt 218. Thus, with the output power of the engine 201, not only the left and right transporting wheels 207 can be driven via the axle 206, but also the cultivating claws 210 can be driven by way of the rotary-side intermediate shaft 208, chain 207 and cultivating shaft assembly 209. Further, in FIG. 16, reference numeral 220 represents a handle.

Furthermore, in the front-rotary working machine 200, four rows of the cultivating claws 210 are disposed in the widthwise direction of the machine body 202 (i.e., in a direction intersecting the sheet of FIG. 16). The working machine 200 can cultivate the ground by all the cultivating claws 210 rotating in a predetermined one direction together with the cultivating shaft assembly 209.

In the above-discussed front-rotary working machine 200, the rear transmission case 204 and front rotary case 205 of the power transmission casing 203 are integrally combined into a generally L shape (or vertically-inverted V shape) as viewed sideways. Namely, the rear transmission case 204 is inclined rearwardly downwardly while the front rotary case 205 is inclined forwardly downwardly.

As the cultivating claws 210 (constituting a rotary working unit of the working machine 200) cultivates the soil Gr21, the cultivated soil Gr22 tends to heap on the ground. The thus-heaped soil Gr22 may hit the bottom of the rear transmission case 204. As the cultivating depth of the cultivating claws 210 increases, the height of the rear transmission case 204 above the ground surface tends to decrease; if such a tendency becomes strong, the cultivated soil Gr22 would be shaved or pushed away by the bottom of the transmission case 204, which often results in an unsmooth, uneven cultivated ground surface. Because of such unsatisfactory cultivating performance or finish, the conventional front-rotary working machine 200 is susceptible of (i.e., has room for) improvement.

Further, because the rear transmission case 204 is tilted rearwardly downwardly as mentioned above, it can become an obstacle to the cultivated soil Gr22, in which case the cultivated soil Gr22 may pile up in front of the transmission case 204. If the transmission case 204 runs on the piled-up soil Gr23, the soil Gr23 can become a great resistance to travel of the front-rotary working machine 200. The traveling resistance presented by the piled-up soil Gr23 is usually unbalanced, and thus if the traveling resistance is great, it would impose great loads on the human operator to keep linear traveling performance of the working machine 200; in this regard too, the conventional front-rotary working machine 200 has room for improvement.

Furthermore, in the conventional front-rotary working machine 200, where the horizontal engine 201 is employed, the belt transmission mechanism 221 is disposed to the right side of the horizontal engine 201, and the left and right transporting wheels 207 are disposed outwardly of the opposite sides of the belt transmission mechanism 221. Therefore, a distance between the left and right transporting wheels 207 unavoidably becomes great, which would result in a great overall width of the working machine 200.

Often, cultivating operations on a field include weeding operations (furrow-to-furrow tillage) for removing weeds from between ridges (i.e., furrows) in addition to ordinary cultivating operations for cultivating the ridges. Because the furrows between the ridges usually have small widths, there are limitations to the weeding operations using the working machine 200 of a great overall width.

SUMMARY OF THE INVENTION

In view of the foregoing prior art problems, it is a first object of the present invention to provide a front-rotary working machine of a type including cultivating claws in front of a machine body with transporting wheels mounted thereon which can achieve a satisfactory cultivating finish by minimizing interference, of a transmission case, with soil cultivated by a rotary working unit and significantly lessen loads on a human operator by suppressing traveling resistance presented by cultivated soil.

It is a second object of the present invention to provide a front-rotary working machine including cultivating claws in front of a machine body with transporting wheels mounted thereon which can achieve enhanced operability in cultivating furrows.

To accomplish the above-mentioned first object, the present invention provides an improved front-rotary working machine which comprises a transmission case provided beneath an engine, front and rear driving shafts operatively connected to the engine and projecting from front and rear portions, respectively, of the transmission case so that transporting wheels are drivable via the rear driving shaft and a rotary working unit is drivable via the front driving shaft, where the transmission case has a generally flat underside to extend substantially parallel to a ground surface to be cultivated.

Even when soil cultivated by the rotary working unit has heaped to a considerable height on the ground surface, the front-rotary working machine of the present invention can prevent the transmission case from undesirably interfering with the heaped soil; namely, it is possible to avoid the prior art problem that the heaped soil is undesirably shaved by the underside of the transmission case. As a result, the front-rotary working machine of the present invention can ensure a superior cultivating finish.

Further, with the present invention, the cultivated soil can be reliably prevented from piling up in front of the transmission case. Thus, it is always possible to prevent the transmission case from running on piled-up soil, so that resistance to travel of the working machine can be minimized. Because unbalanced traveling resistance can be thus avoided, it is possible to effectively lessen loads on a human operator in keeping desired linear traveling performance.

In a preferred embodiment, the underside of the transmission case is slightly inclined rearwardly and downwardly with respect to the ground surface to be cultivated. Because the underside of the transmission case is flat and inclined in the rearward and downward direction with respect to the ground surface to be cultivated, the working machine can appropriately level the cultivated soil with the underside of the transmission case, thereby achieving an enhanced the cultivating finish. Besides, because the underside of the transmission case is generally parallel to the ground surface and slightly inclined in the rearward and downward direction, the working machine can readily get over cultivated soil when the transmission touches cultivated and piled-up soil.

In order to accomplish the above-mentioned second object, the present invention provides an improved front-rotary working machine which comprises: a vertical engine having an output shaft projecting downward from a body of the engine; a transmission case provided beneath the vertical engine and thereby having a relatively great dimension in a front-and-rear direction of the working machine and a relatively small dimension in a widthwise direction of the working machine; left and right transporting wheels connected to both end portions of an axle or driving shaft projecting laterally from opposite sides of a rear end portion of the transmission case; and a rotary working unit disposed in front of the transmission case. By the use of the vertical engine with its output shaft projecting downward, the overall width of the working machine can be significantly reduced. Further, because the transmission case is disposed beneath the vertical engine, a power transmission mechanism for transmitting power from the engine to a transmission system does not project in the widthwise direction of the working machine. Further, because the transmission case has a greater dimension in the front-and-rear direction of the working machine and a smaller dimension in the widthwise direction of the working machine than those in the conventional counterparts, the overall width of the working machine can be reduced even further. These arrangements allow the distance between the left and right transporting wheels, connected to the axle at a rear end portion of the transmission case, to be reduced as necessary, as a result of which the overall width of the front-rotary working machine can be reduced. Consequently, the working machine can be readily positioned on a narrow furrow between ridges of a field to thereby efficiently work on the narrow furrow while traveling therealong, and thus it is possible to enhance the operability of the working machine in narrow-space operations, such as weeding operations on a furrow.

BRIEF DESCRIPTION OF THE DRAWINGS

Certain preferred embodiments of the present invention will hereinafter be described in detail, by way of example only, with reference to the accompanying drawings, in which:

FIGS. 8A and 8B are views showing a rotary working unit employed in the embodiment of the present invention;

DETAILED DESCRIPTION OF THE PREFERRED EMBODIMENTS

Figure 1:
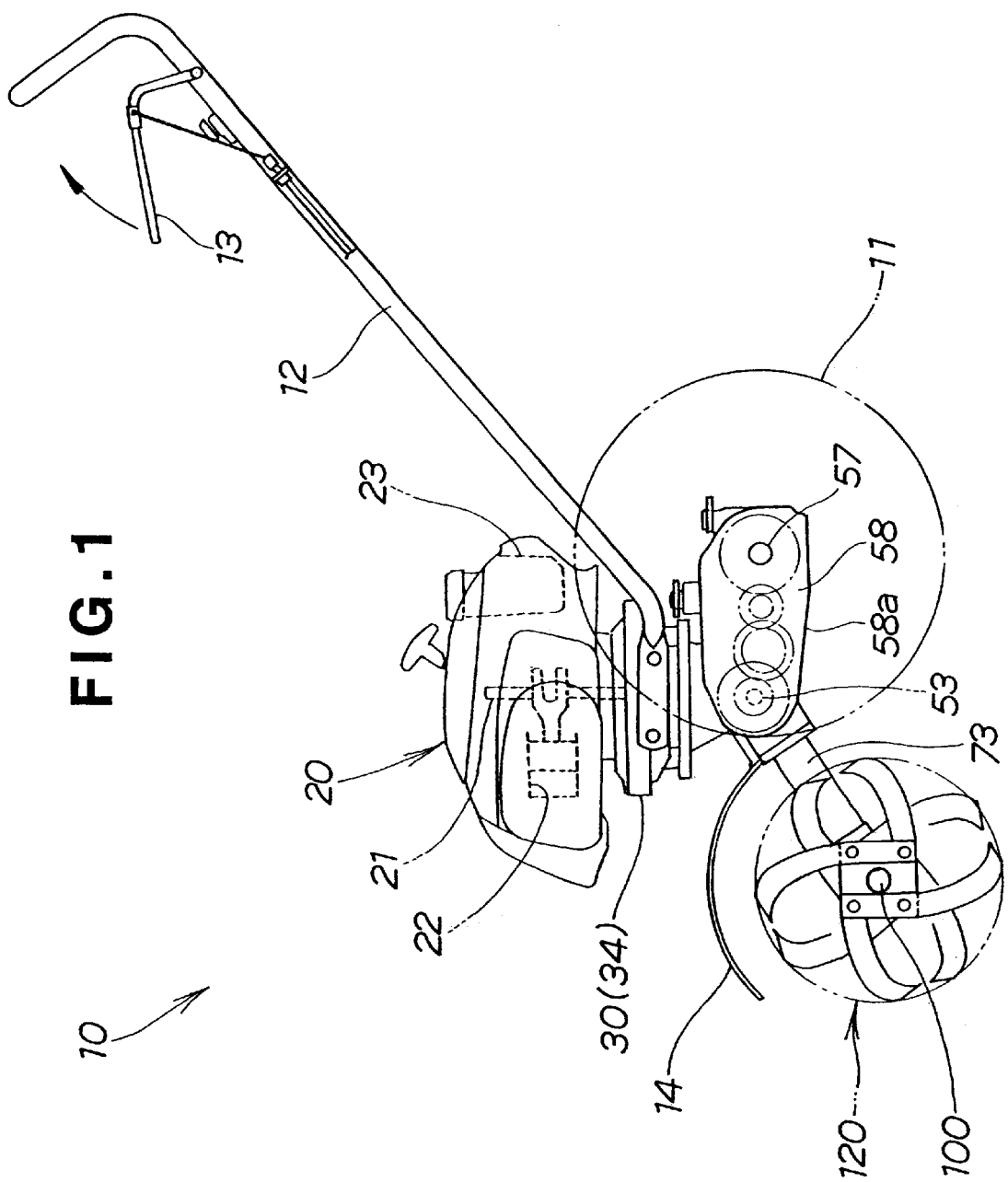
FIG. 1 is a left side view of a front-rotary working machine in accordance with an embodiment of the present invention.

It should be noted that throughout the drawings the reference character "CL" represents a widthwise center of a body of a working machine according to the present invention.

FIG. 1 is a left side view of a front-rotary working machine 10 in accordance with an embodiment of the present invention. This front-rotary working machine 10 is constructed as a small-size walking-type (or self-propelled) cultivator, which includes transmission case 58 constituting a machine body and having left and right transporting wheels (only the left transporting wheel is shown) 11 attached thereto and a rotary working unit 120 disposed in front of the transmission case 58.

Specifically, the front-rotary working machine 10 is a walking-type cultivator where the left and right transporting wheels 11 are rotatably attached to the transmission case 58 and both the transporting wheels 11 and the rotary working unit 120 are driven by a same engine 20 mounted on the transmission case 58. More specifically, in FIG. 1, the transmission case 58 is positioned beneath the engine 20 with a main clutch mechanism 30 interposed therebetween, and output shafts 53 and 57 project laterally from opposite sides of front and rear portions, respectively, of the transmission case 58. The rotary working unit 120 is driven via the front output shaft (i.e., rotary-side intermediate shaft) 53, while the left and right transporting wheels 11 are driven by via the rear output shaft (axle) 57. This way, the transporting wheels 11 can be positioned along the opposite sides of the rear portion of the transmission case 58, and the rotary working unit 120 can be positioned in front of the transmission case 58.

The engine 20, functioning as a drive source of the working machine 10, is a vertical engine having its output shaft (crank shaft) 21 oriented in a substantially vertical direction to project downward from the body of the engine 20. The engine 20 also includes a cylinder 22 extending forward in a substantially horizontal direction, and an oil tank 23 near its rear end.

The working machine 10 also includes an operating handle 12 that extends from a rear end portion of a clutch case 34 of the main clutch mechanism 30 and has a clutch lever 13 pivotally mounted thereon. The clutch lever 13 is provided for manipulating the main clutch mechanism 30. In the figure, reference numeral 14 represents a cover for preventing scattering of earth and sand.

Figure 2:
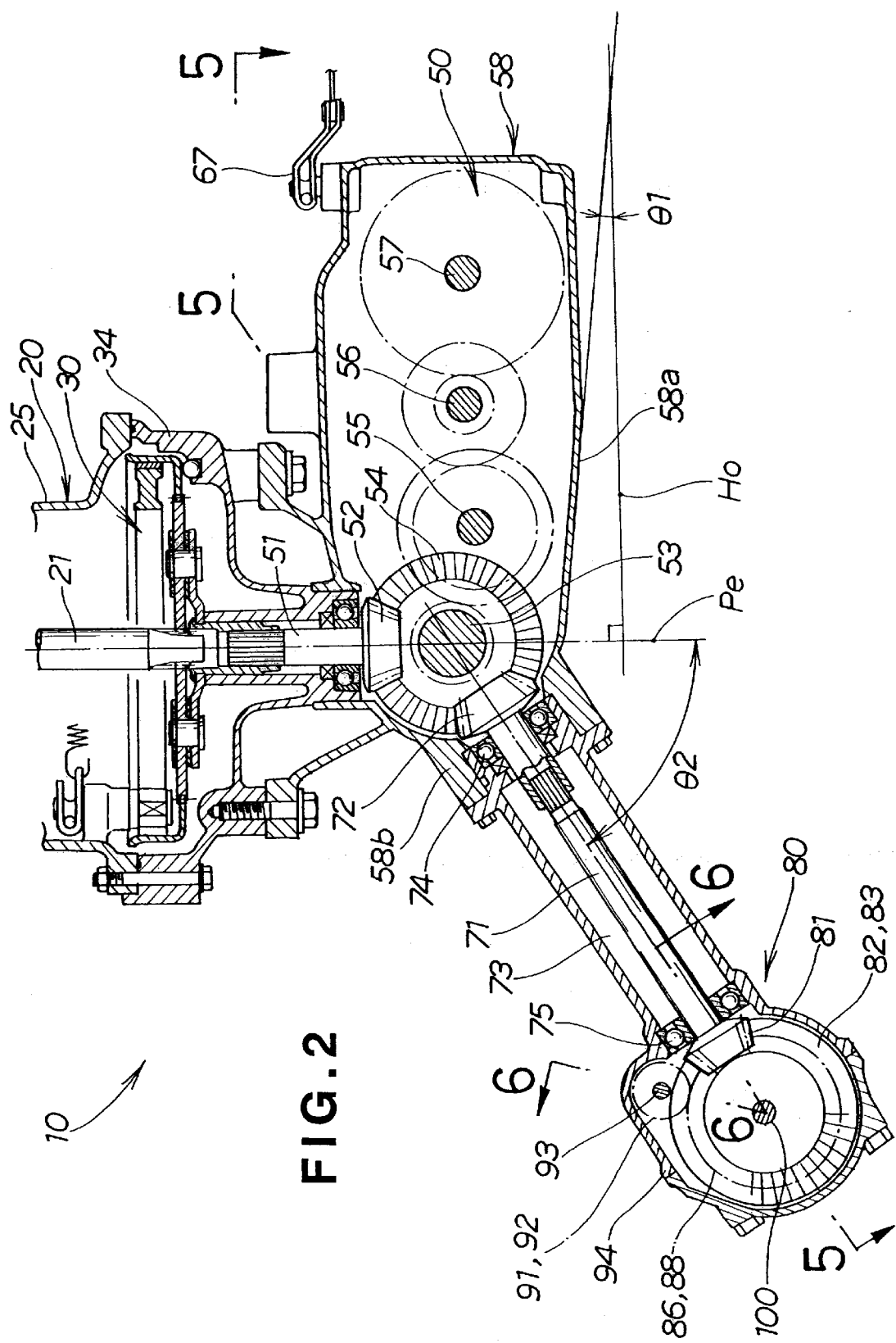
FIG. 2 is a sectional view of the front-rotary working machine of FIG. 1, which particularly shows an engine, main clutch mechanism and transmission case.

FIG. 2 is a sectional view of the working machine 10, which shows the engine 20, main clutch mechanism 30 and transmission case 58. FIG. 2 particularly shows, from a left side of the working machine 10, the downwardly-projecting output shaft 21 of the engine 20 and a transmission mechanism 50 coupled via the main clutch mechanism 30 to the lower end of the output shaft 21. The clutch case 34 is bolted at its top to the lower end of the body 25 of the engine 20 and the transmission case 58 of the transmission mechanism 50 is bolted to the lower end of the clutch case 34, so that the clutch case 34 and transmission case 58 function as the body of the working machine 10.

Figure 3:
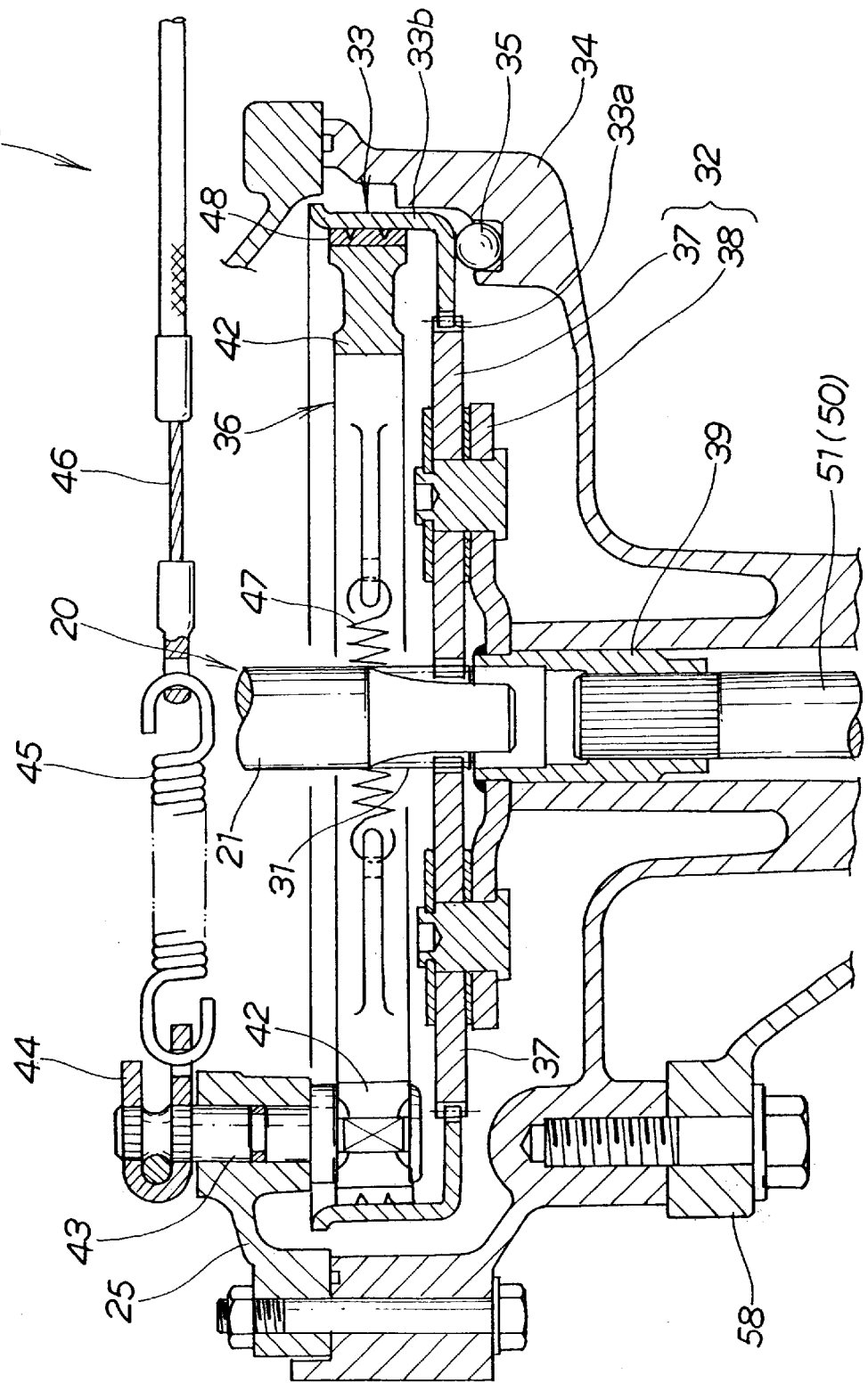
FIG. 3 is a sectional view showing the main clutch mechanism employed in the embodiment of the present invention.

FIG. 3 is a sectional view corresponding to FIG. 2 and showing the main clutch mechanism 30 employed in the embodiment of the present invention. The main clutch mechanism 30 includes a sun gear 31 mounted on the output shaft 21 of the engine 20, a planetary gear assembly 32 meshingly engaging with the sun gear 31 and an inner gear 33 meshingly engaging with the planetary gear assembly 32. The main clutch mechanism 30 also includes the clutch case 34 accommodating therein the sun gear 31, planetary gear assembly 32 and inner gear 33, a plurality of balls 35 held between the inner gear 33 and the clutch case 34 for supporting the inner gear 33, and a brake 36 for locking or unlocking the inner gear 33.

The planetary gear assembly 32 includes a plurality of planetary gears 37 meshingly engaging with the sun gear 31 and inner gear 33, and a planet frame 38 rotatably supporting these planetary gears 37. The planet frame 38 has, at its center, a joint 39 spline-coupled with an input shaft 51 of the transmission mechanism 50.

The inner gear 33 includes a gear section 33a meshing with the planetary gears 37, and a cylindrical section 33b against which the brake 36 is pressed. Namely, the cylindrical section 33b functions as a brake drum.

Figure 4:
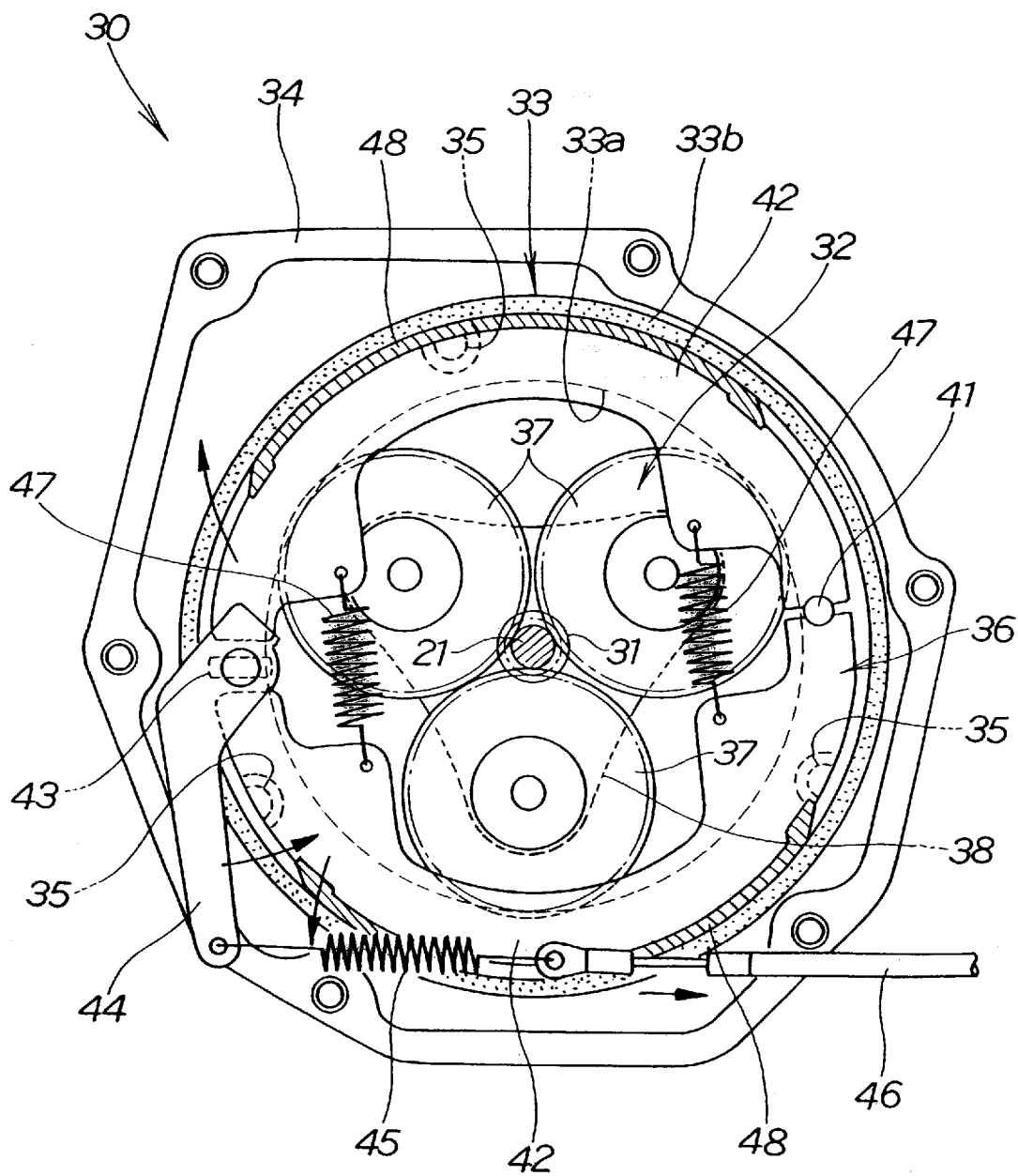
FIG. 4 is a plan view showing the main clutch mechanism.

FIG. 4 is a plan view of the main clutch mechanism 30. As shown, the brake 36 of the main clutch mechanism 30 includes an anchor pin 41 secured to the clutch case 34, a pair of brake shoes 42 retained by the anchor pin 41, and an actuating cam 43 for displacing the brake shoes 42 toward or away from each other. The main clutch mechanism 30 also includes a lever 44 operatively connected to the actuating cam 43, and a cable 46 coupled at one end with the lever 44 via a tension spring 45.

The brake shoes 42 are normally urged toward each other by return springs 47, and each of the brake shoes 42 has a brake pad 48 for pressing against and thereby locking the inner gear 33. The cable 46 is connected at the other end to the clutch lever 13 (FIG. 1).

The following paragraphs describe operation of the main clutch mechanism 30, with reference to FIG. 3. In the illustrated example of FIG. 3, the brake 36 is in a non-braking state where the inner gear 33 is freely rotatable. As the output shaft 21 of the engine 20 turns the sun gear 31, the rotating sun gear 31 rotates the planetary gears 37, at which time the inner gear 33 is allowed to turn freely and thus the planet frame 38 is left unrotated. Therefore, the main clutch mechanism 30 is kept in a so-called clutch-off state where it does not transmit the power of the engine 20 via the output shaft 21 to the transmission mechanism 50.

Then, once the human operator pulls the cable 46 via the clutch level 13 (FIG. 1), the brake 36 is turned on so that the inner gear 33 is brought to a non-rotatable state. As the output shaft 21 of the engine 20 turns the sun gear 31, the rotating sun gear 31 rotates the planetary gears 37. At this time, the inner gear 33 is in a locked state so as not to turn, and thus the planet frame 38 is rotated. In this way, the main clutch mechanism 30 is switched to a so-called clutch-on state where it transmits the power of the engine 20 via the output shaft 21 to the transmission mechanism 50. Once the clutch lever 13 is released, the main clutch mechanism 30 is automatically returned to the clutch-off state.

Referring back to FIG. 2, the input shaft 51 of the transmission mechanism 50 is provided coaxially in vertical alignment with the output shaft 21 of the engine 20. The power of the engine 20 can be delivered from the input shaft 51 of the transmission mechanism 50 to the rotary-side intermediate shaft 53 via meshing engagement between a driving bevel gear 52 provided at the lower end of the input shaft 51 and a first driven bevel gear 54 provided on the rotary-side intermediate shaft 53.

The transmission mechanism 50 is organized by arranging, horizontally in the front-and-rear direction of the machine 10, the rotary-side intermediate shaft 53, first intermediate shaft 55, second intermediate shaft 56 and axle 57 in the mentioned order and operatively connecting these shafts 53 and 55–57 via a gear mechanism. With this arrangement, the transmission case 58 of the transmission mechanism 50 can have a relatively great dimension in the front-and-rear direction and a much smaller dimension in the widthwise direction of the working machine (direction intersecting the sheet of the figure). Further, the transmission case 58 can have a reduced height or lower profile.

The transmission case 58 has a flat underside 58a to extend substantially parallel to the ground surface to be cultivated. Specifically, if the engine output shaft 21 has a longitudinal centerline Pe perpendicular to the level ground, the underside 58a of the transmission case 58 extends generally parallel to a horizontal plane Ho that is perpendicular to the centerline Pe and parallel to the level ground. More specifically, in the illustrated example of FIG. 2, the underside 58a of the transmission case 58 has a former half portion that is extremely gently inclined rearwardly and downwardly; the inclination angle θ1 of the underside 58a relative to the horizontal plane Ho is about 5°.

Further, in the working machine 10, the rotary-side intermediate shaft 53 and rotary working unit 120 (FIG. 1) are operatively connected with each other via a transmission shaft 71 enclosed by a cylindrical casing 73 that is in turn secured to the transmission case 58.

More specifically, the first driven bevel gear 54 mounted on the rotary-side intermediate shaft 53 meshes with a second driven bevel gear 72 mounted on the transmission shaft 71, the transmission shaft 71 extends forwardly and downwardly toward a cultivating shaft assembly 100, the transmission shaft 71 is rotatably supported within the cylindrical casing 73 via bearings 74 and 75, and the cylindrical casing 73 is bolted at its proximal end to a mounting seat portion of the transmission case 58. Inclination angle θ2 of the transmission shaft 71 and cylindrical casing 73 relative to the longitudinal centerline Pe is about 60°.

Because the working machine 10 employs the low-profile (low-height) transmission case 58 as set forth above, the underside 58a of the transmission case 58 can be located at a relatively great vertical distance from the cultivating shaft assembly 100; therefore, a distance of the underside 58a from the ground surface can be increased as compared to that in the conventional front-rotary working machines. The cylindrical casing 73 has an accommodating cover 94 attached thereto in such away as to close the front end of the casing 73. The accommodating case 94 is removable from the fore end of the cylindrical casing 73 as necessary. Specifically, when attached to the casing 73, the rear end surface of the accommodating case 94 is abutted against the front end of the cylindrical casing 73 at positions spaced from opposite sides of the cultivating shaft assembly 100; thus, as necessary, the accommodating case 94 can be detached from the cylindrical casing 73 by the human operator appropriately manipulating those positions.

As clear from the foregoing description, in the working machine 10, where the vertical engine 20 is disposed between the rear axle 57 and front cultivating shaft assembly 100 in such a manner that the center of gravity of the working machine 10 is located closer to the front end of the machine 10 than in the conventional counterparts, more of the weight of the engine 20 can thus be born by the rotary working unit 120 (FIG. 1).

Further, in the working machine 10 of the present invention, the input shaft 51 of the transmission mechanism 50 is provided coaxially in vertical alignment with the downwardly-projecting output shaft 21 of the engine 20. In the conventional counterparts, on the other hand, there is employed a horizontal engine with a laterally-projecting output shaft, and an endless belt is wound on and extends between the output shaft of the engine and the input shaft of the transmission mechanism. With such a novel arrangement, the engine 20 in the present invention can be disposed closer to the upper surface of the transmission case 58. Because the position of the engine 20 can be lowered, the center of gravity of the entire working machine 10 can be lowered as compared to that in the conventional counterparts.

Figure 5:
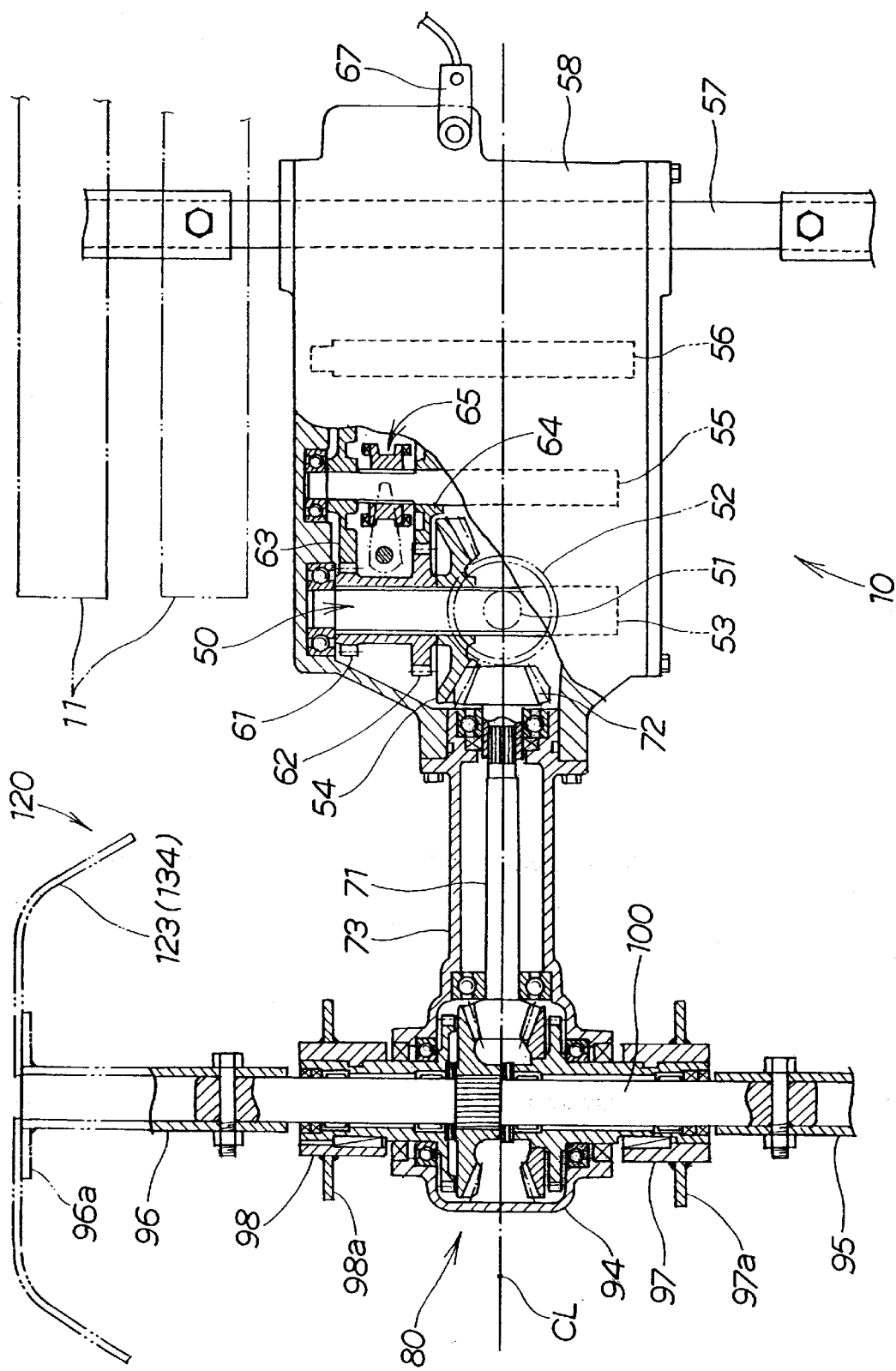
FIG. 5 is a sectional view taken along the 5—5 line of FIG. 2.

FIG. 5 is a sectional view taken along the 5—5 line of FIG. 2, which particularly shows the transmission case 58. In the transmission case 58, first and second driving spur gears 61 and 62 are mounted on the rotary-side intermediate shaft 53, and first and second driven gears 63 and 64 and dog clutch 65 are mounted on the first intermediate shaft 55. In response to manipulation, by the human operator, of the dog clutch 65, the transmission case 58 can break power transmission from the rotary-side intermediate shaft 53 to the axle 57 via the first intermediate shaft 55, or permit high-speed or low-speed power transmission from the rotary-side intermediate shaft 53 to the axle 57 via the first intermediate shaft 55. Reference numeral 67 represents a speed change lever.

Specifically, FIG. 5 shows the transmission case 58 of the transmission mechanism 50 having a relatively great dimension in the front-and-rear direction and a much smaller dimension in the widthwise direction of the working machine 10. Because of the small width of the transmission case 58, the transporting wheels 11, denoted by imaginary lines in FIG. 5, can be positioned closer to or farther from the widthwise center CL of the machine body, as necessary.

Figure 6:
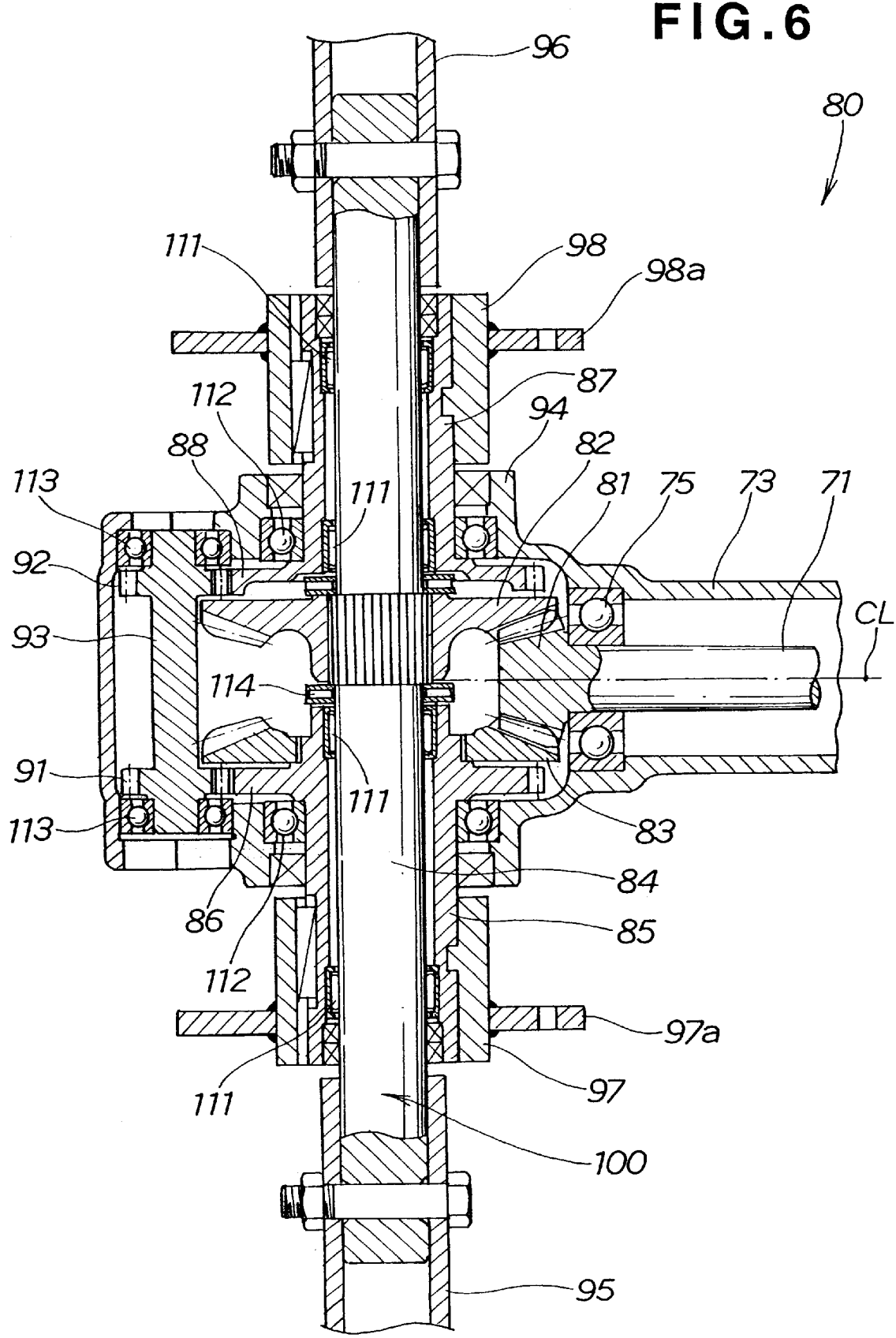
FIG. 6 is a sectional view taken along the 6—6 line of FIG. 2.

FIG. 6 is a sectional view taken along the 6—6 line of FIG. 2, which corresponds to FIG. 5 and which particularly shows, in section, a cultivating power transmission mechanism 80 for transmitting the cultivating power from the transmission mechanism 50 to the cultivating shaft assembly 100. The cultivating shaft assembly 100, which extends horizontally across the width of the machine body, includes a main cultivating shaft 84 and left and right hollow shafts 85 and 87.

The cultivating power transmission mechanism 80 includes the transmission shaft 71 for transmitting the power of the engine 20 (FIG. 2) toward the cultivating shaft assembly 100, first bevel gear 81 mounted at the distal end of the transmission shaft 71, second and third bevel gears 82 and 83 provided in parallel relation to each other and meshing with the first bevel gear 81, and main cultivating shaft 84 having the second bevel gear 82 provided thereon. The cultivating power transmission mechanism 80 also includes the left hollow shaft 85 fitted over the main cultivating shaft 84 for rotating movement relative to the shaft 84 and having the third bevel gear 83 provided thereon, and left gear 86 provided on the left hollow shaft 85 separately from the third bevel gear 83. The cultivating power transmission mechanism 80 further includes the right hollow shaft 87 fitted over the main cultivating shaft 84 for rotating movement relative to the shaft 84 with the second and third bevel gears 82 and 83 sandwiched between the left gear 86 and the hollow shaft 87, and right gear 88 provided on the right hollow shaft 87. Furthermore, the cultivating power transmission mechanism 80 includes a countershaft 93 having left and right counter gears 91 and 92 and connecting between the left and right gears 86 and 88 to mechanically connect the right gear 88 to the left gear 86, and accommodating case 94 collectively accommodating therein at least the transmission shaft 71, first to third bevel gears 81 to 83, left and right gears 86 and 88 and countershaft 93.

The main cultivating shaft 84, which is a long hollow shaft extending across the width of the machine body, has left and right counter-rotating sleeves 95 and 96 removably fixed to its left and right ends by means of bolts or otherwise. The left hollow shaft 85 has a left forward-rotating sleeve 97 attached to its left end by means of a key or the like. Similarly, the right hollow shaft 87 has a right forward-rotating sleeve 98 attached to its right end by means of a key or the like. In the figure, reference numerals 111 to 113 represent radial bearings, and 114 represents thrust bearings.

Figure 7:
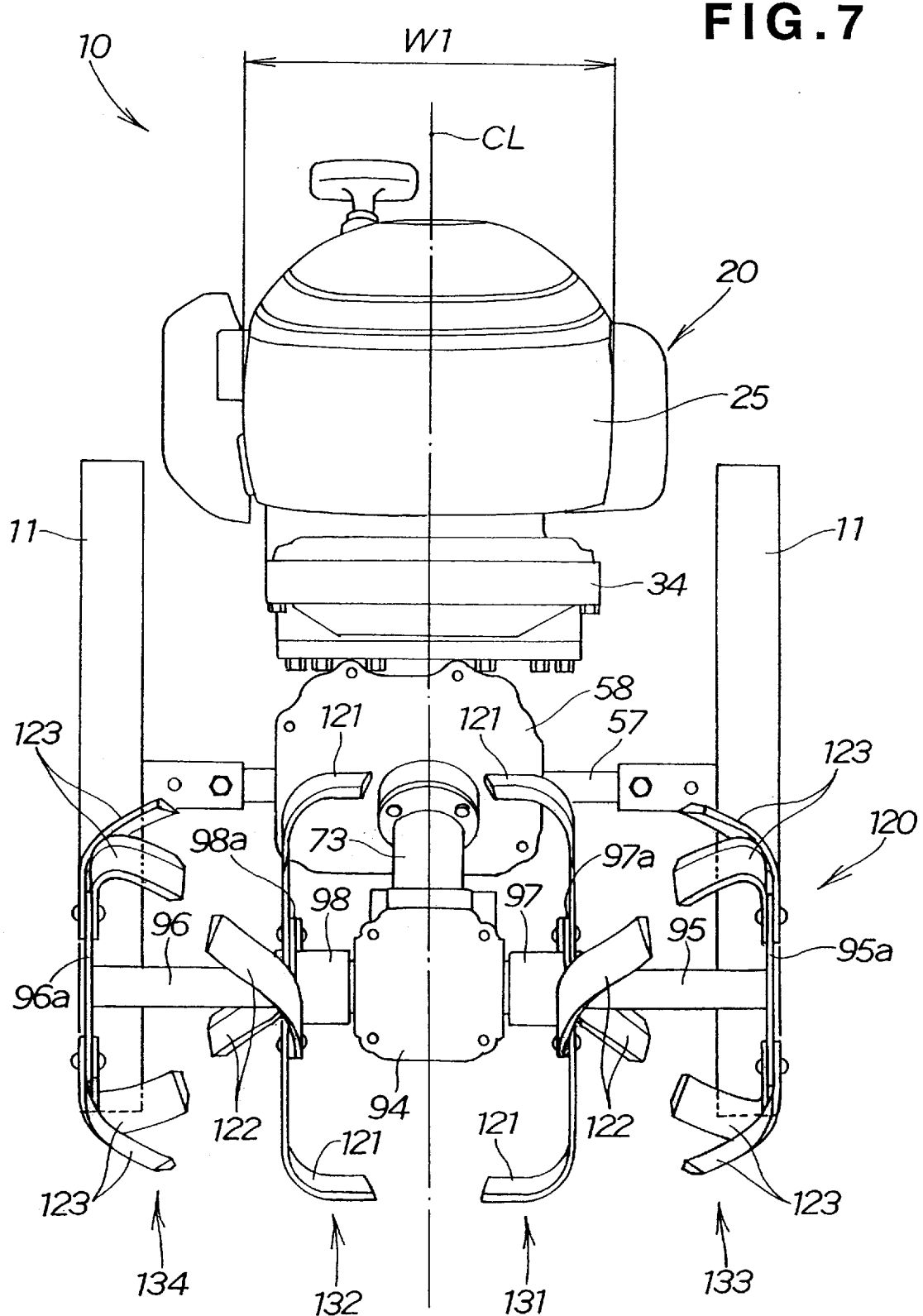
FIG. 7 is a front view of the front-rotary working machine of the present invention.

FIG. 7 is a front view of the front-rotary working machine of the present invention. FIG. 7 particularly shows the engine 20, clutch case 34, transmission case 58 and cylindrical case 73 disposed along the widthwise center CL, and the clutch case 34 and transmission case 58 positioned within the width W1 of the body of the engine 20.

The plurality of cultivating claws of the rotary working unit 120 comprise forward-rotating cultivating claws 121 and 122 (namely, first forward-rotating cultivating claws 121 and second forward-rotating cultivating claws 122) and counter-rotating cultivating claws 123. Hereinafter, the terms "cultivating claws" generically refer to these first and second forward-rotating cultivating claws 121 and 122 and counter-rotating cultivating claws 123. Also, the terms "forward-rotating cultivating claws" generically refer to the first and second forward-rotating cultivating claws 121 and 122.

The rotary working unit 120 in the instant embodiment is characterized in that a plurality of the forward-rotating cultivating claws 121 and 122 are positioned centrally in the widthwise direction of the transmission case 58 and the counter-rotating cultivating claws 123 are positioned outwardly of the forward-rotating cultivating claws 121 and 122 in the widthwise direction of the machine body.

Specifically, the rotary working unit 120 includes four rows of the cultivating claws arranged in the widthwise direction of the machine body: 1) the first row 131 of the forward-rotating cultivating claws 121 and 122 (first cultivating claw group 131) provided on a mounting plate 97a of the inner-left forward-rotating sleeve 97; 2) the second row 132 of the forward-rotating cultivating claws 121 and 122 (second cultivating claw group 132) provided on a mounting plate 98a of the inner-right forward-rotating sleeve 98; 3) the third row 133 of the counter-rotating cultivating claws 123 (third cultivating claw group 133) provided on a mounting plate 95a of the outer-left counter-rotating sleeve 95; and 4) the fourth row 134 of the counter-rotating cultivating claws 123 (fourth cultivating claw group 134) provided on a mounting plate 96a of the outer-right counter-rotating sleeve 96.

The left and right transporting wheels 11 are disposed rearwardly of the counter-rotating cultivating claws 123. Namely, the left transporting wheel 11 is positioned rearwardly of the third cultivating claw group 133 while the right transporting wheel 11 is positioned rearwardly of the fourth cultivating claw group 134.

It should be clear from the foregoing that because the working machine 10 of the present invention employs the vertical engine 20 and the output shaft 21 (FIG. 2) is positioned centrally in the widthwise direction (i.e., at the widthwise center CL) of the machine body, it is possible to enhance weight balance, in the widthwise direction, of the working machine 10. Further, because the vertical engine 20 is located at the widthwise center CL, it is possible to position the left and right transporting wheels 11 closer to the widthwise center CL by placing them closer to the engine 20 in such a way to sandwich the engine 20 with smaller gaps left therebetween.

FIGS. 8A and 8B are views showing the rotary working unit 120 employed in the present invention. Specifically, FIG. 8A is an exploded view of the rotary working unit 120, and FIG. 8B is a view taken in a direction of arrow "b" of FIG. 8A. Illustration of the mounting plates 95a, 96a, 97a and 98a and the cultivating shaft 100 shown in FIGS. 6 and 7 is omitted here, to facilitate understanding.

The forward-rotating cultivating claws 121 and 122 are constructed to rotate in a forward direction R1 generally corresponding to a traveling direction Ru of the working machine 10 (see FIG. 7), while the counter-rotating cultivating claws 123 are constructed to rotate in a counter-rotating direction R2 generally opposite to the forward direction R1.

The rotary working unit 120 employed in the present invention is characterized in that the forward-rotating cultivating claws 121 and 122 of the individual rows are positioned in phase with one another as viewed sideways and similarly the counter-rotating cultivating claws 123 of the individual rows are positioned in phase with one another as viewed sideways, as will be detailed below.

The first and second cultivating claw groups 131 and 132 each comprise a total of four forward-rotating cultivating claws 121 and 122 combined together overlappingly, at their respective base portions, into a parallel cross configuration about an axial center Pf of the cultivating shaft assembly 100. Similarly, the third and fourth cultivating claw groups 133 and 134 each comprise a total of four counter-rotating cultivating claws 123 combined together overlappingly, at their respective base portions, into a parallel cross configuration about the axial center Pf of the cultivating shaft assembly 100.

In the illustrated example of FIG. 8A, the first cultivating claw group 131 consists of four cultivating claws: the one first forward-rotating cultivating claw 121 extending generally in the traveling direction Ru (namely, in the forward and upward direction); the one second forward-rotating cultivating claw 122 extending in the rearward and upward direction; the other first forward-rotating cultivating claw 121 extending in the rearward and downward direction; and the other second forward-rotating cultivating claw 122 extending in the forward and downward direction. The two first forward-rotating cultivating claws 121 each have a distal end portion slightly curved toward the adjoining second cultivating claw group 132 as well as in the counter-rotating direction R2. The two second forward-rotating cultivating claws 122 each have a distal end portion slightly curved toward the adjoining third cultivating claw group 133 as well as in the counter-rotating direction R2.

The second cultivating claw group 132 is configured symmetrically with the first cultivating claw group 131, as seen from FIG. 8A.

The third cultivating claw group 133 consists of four counter-rotating cultivating claws 123 that are provided in corresponding relation to the cultivating claws of the first cultivating claw group 131 but phase-shifted, in the forward-rotating direction R1, by about 45° from the corresponding cultivating claws of the first cultivating claw group 131. The counter-rotating cultivating claws 123 each have a distal end portion slightly curved toward the adjoining first cultivating claw group 131 as well as in the forward-rotating direction R1.

The fourth cultivating claw group 134 is configured symmetrically with the third cultivating claw group 133.

Needless to say, the angular phases of the first to fourth cultivating claw groups 131 to 134 vary as the cultivating shaft assembly 100 is rotated (see FIG. 7).

The following paragraphs describe behavior of the cultivating power transmission mechanism 80, with reference to FIGS. 2, 7 and 9–11.

In FIG. 2, the power of the vertical engine 20 is transmitted from the output shaft 21 to the transmission shaft 71 by way of the main clutch mechanism 30, input shaft 51 of the transmission mechanism 50, driving bevel gear 52, first driven bevel gear 54 and second driven bevel gear 72.

Figure 9:
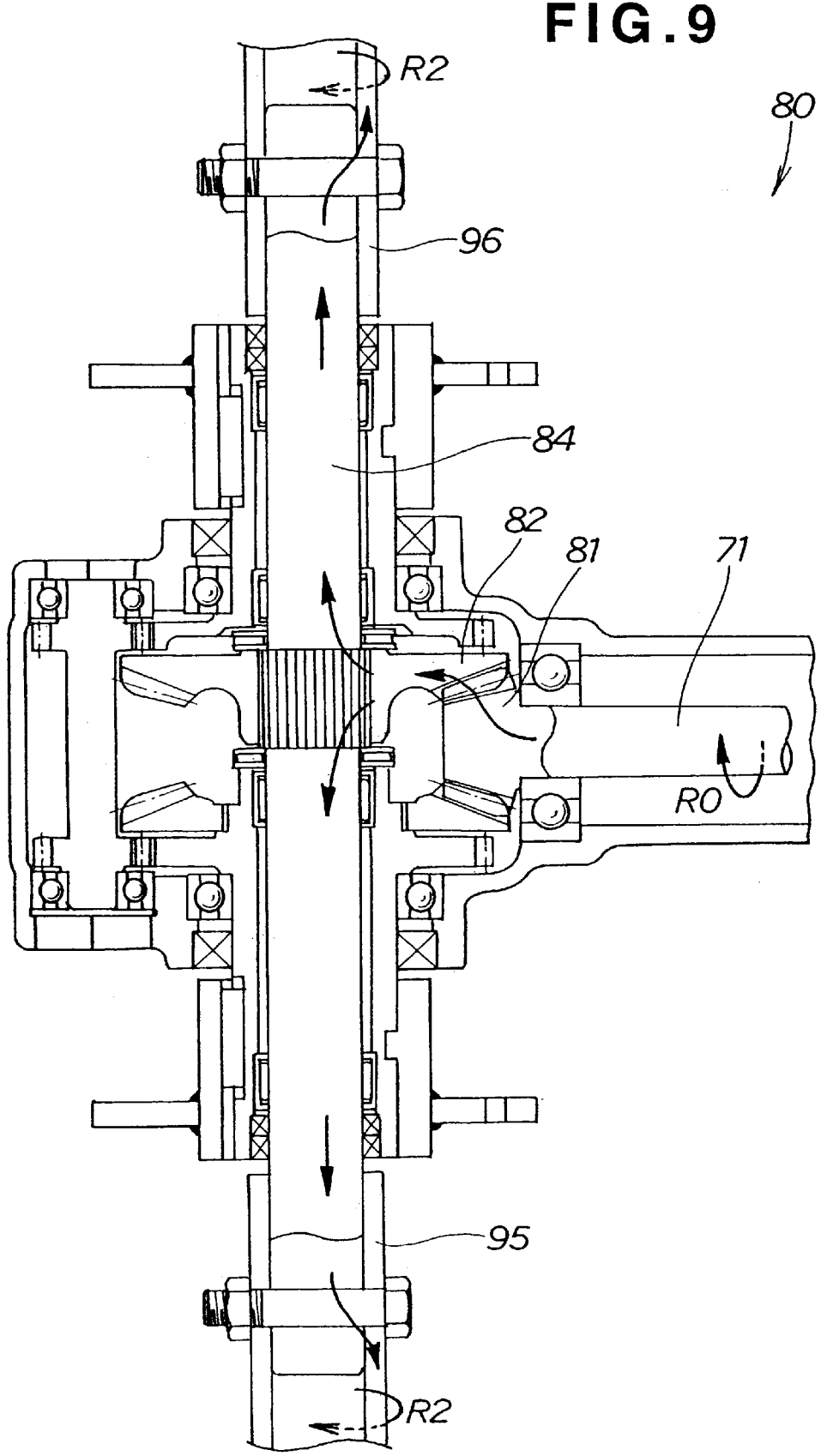
FIG. 9 is a view explanatory of behavior of a cultivating power transmission mechanism employed in the embodiment of the present invention.

FIG. 9 is a view explanatory of behavior of the cultivating power transmission mechanism 80 employed in the embodiment of the present invention. As the transmission shaft 71 is rotated via the engine 20 in a predetermined direction R0, the engine power is transmitted to the left and right counter-rotating sleeves 95 and 96 by way of the first bevel gear 81, second bevel gear 82 and main cultivating shaft 84. As a consequence, the left and right counter-rotating sleeves 95 and 96 are rotated in the counter-rotating direction R2.

Figure 10:
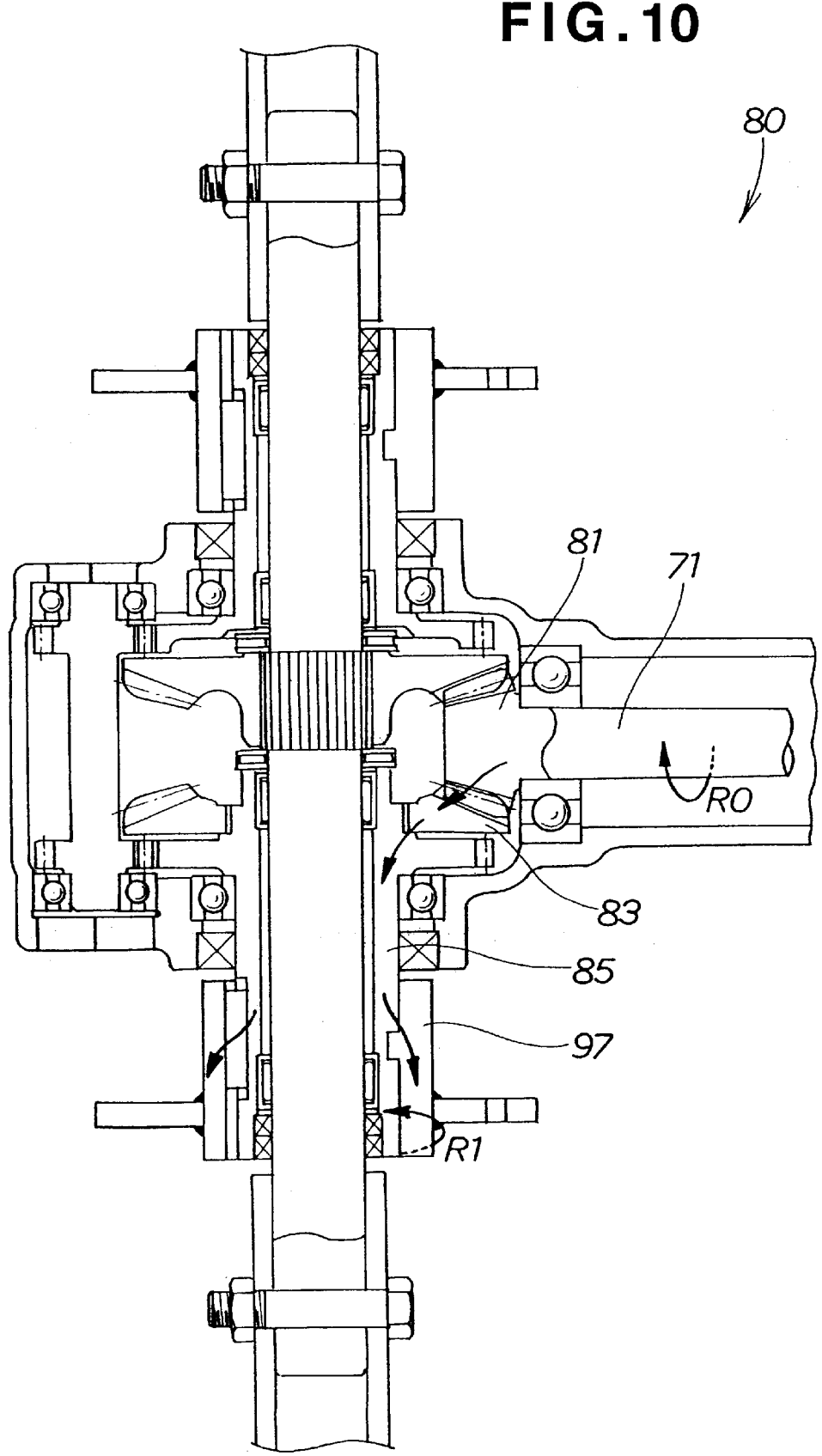
FIG. 10 is another view explanatory of behavior of the cultivating power transmission mechanism.

FIG. 10 is another view explanatory of behavior of the cultivating power transmission mechanism 80. As the transmission shaft 71 is rotated via the engine 20 in the predetermined direction R0, the engine power is also transmitted to the left forward-rotating sleeve 97 by way of the first bevel gear 81, third bevel gear 83 and left hollow shaft 85. As a consequence, the left forward-rotating sleeve 97 is rotated in the forward-rotating direction R1.

Figure 11:
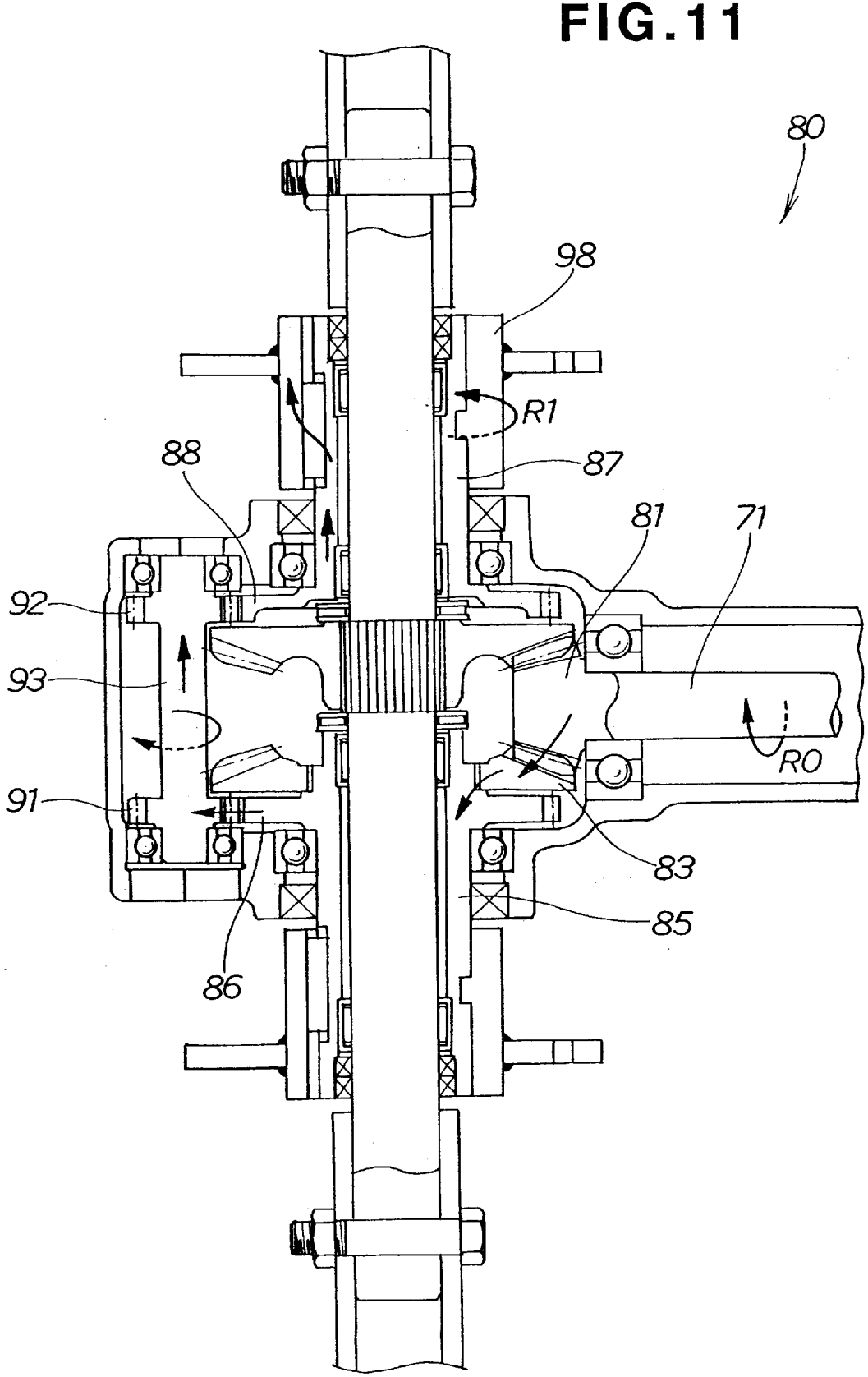
FIG. 11 is still another view explanatory of behavior of the cultivating power transmission mechanism.

FIG. 11 is still another view explanatory of behavior of the cultivating power transmission mechanism 80. As the transmission shaft 71 is rotated via the engine 20 in the predetermined direction R0, the engine power is also transmitted to the right forward-rotating sleeve 98 by way of the first bevel gear 81, third bevel gear 83, left hollow shaft 85, left gear 86, left counter gear 91, countershaft 93, right counter gear 92, right gear 88 and right hollow shaft 87. As a consequence, the right forward-rotating sleeve 98 is rotated in the forward-rotating direction R1.

In this way, the working machine 10 can perform cultivating operations by rotating, with the power of the engine 20, the counter-rotating claws 123 mounted on the left and right counter-rotating sleeves 95 and 96 (main cultivating shaft 84 of FIG. 6) and forward-rotating claws 121 and 122 mounted on the left and right forward-rotating sleeves 97 and 98 (left and right hollow shafts 85 and 87 of FIG. 6) in opposite directions, as illustrated in FIG. 7.

Figure 12:
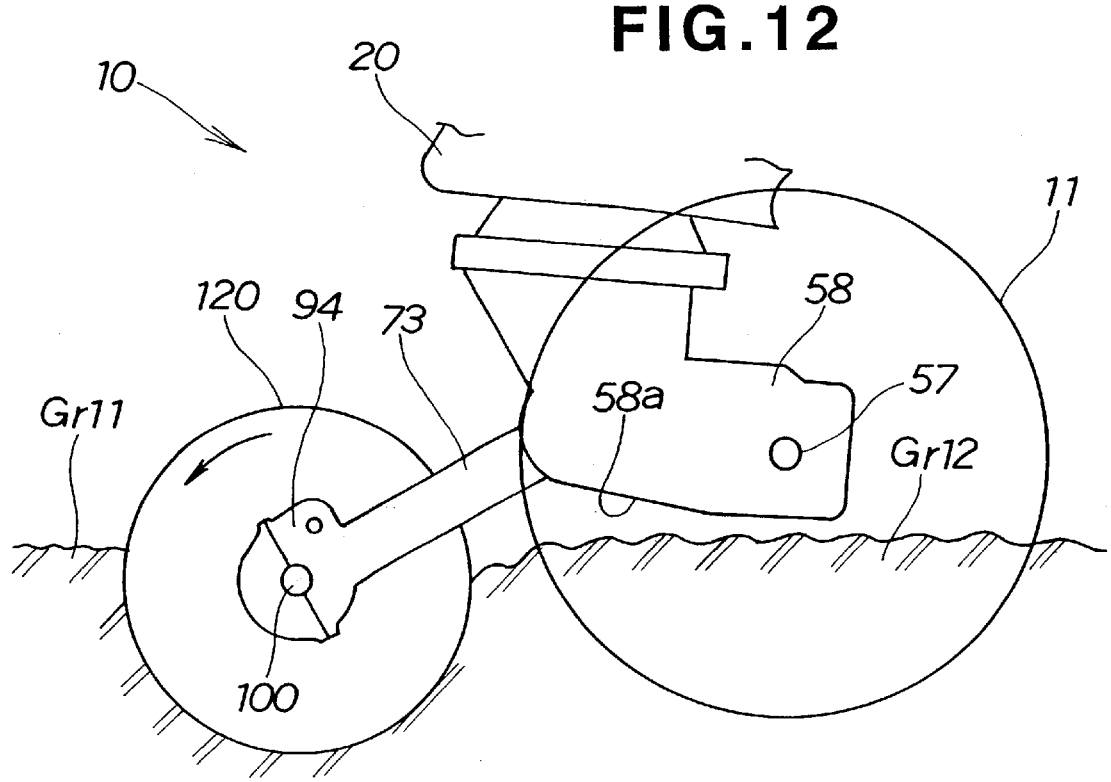
FIG. 12 is a view explanatory of behavior of the front-rotary working machine of the present invention, which particularly shows behavior when the rotary working unit is set to a medium cultivating depth.

FIG. 12 is a view explanatory of behavior of the front-rotary working machine 10 of the present invention, which particularly shows behavior when the rotary working unit 120 is set to a medium cultivating depth. As the rotary working unit 120 cultivates the ground Gr11, the cultivated soil Gr12 would heap. To address the heaping of the cultivated soil Gr12, the front-rotary working machine 10 of the present invention employs the transmission case 58 having a low profile, whose underside 58a is generally flat and parallel to the ground surface Gr1. Therefore, even when the soil cultivated by the working section 120 has heaped in the case where the rotary working unit 120 is set to a medium cultivating depth, the underside 58a of the transmission case 58 is prevented from hitting the heaped soil GR12.

Figure 13:
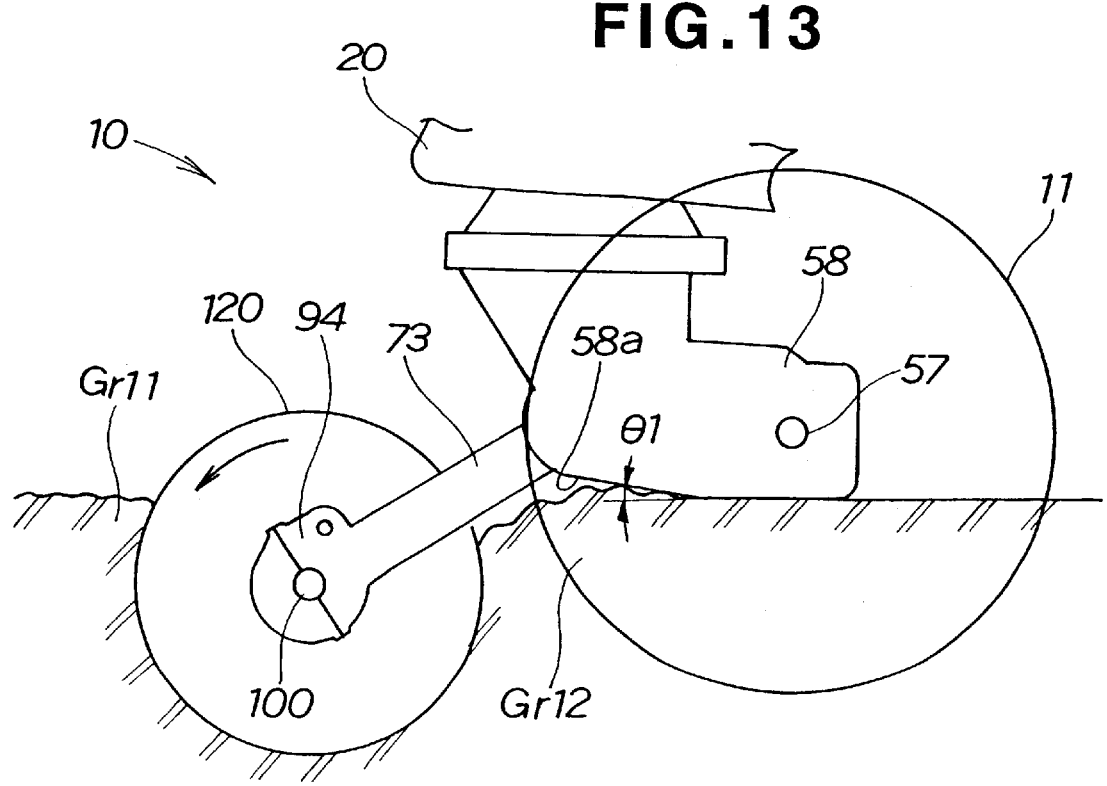
FIG. 13 is another view explanatory of behavior of the front-rotary working machine of the present invention, which particularly shows behavior when the rotary working unit is set to a great cultivating depth.

FIG. 13 is a view explanatory of behavior of the front-rotary working machine 10 of the present invention, which particularly shows behavior when the rotary working unit 120 is set to a great cultivating depth. Even in the case where the rotary working unit 120 is set to a great cultivating depth, the front-rotary working machine 10 can prevent the transmission case 58 from undesirably interfering with heaped soil GR12; namely, it is possible to avoid the prior art problem that the heaped soil GR12 is shaved by the underside 58a of the transmission case 58. As a result, the front-rotary working machine 10 can ensure a superior cultivating finish.

Further, because the underside 58a of the transmission case 58 is generally flat and parallel to the ground surface Gr1, it is possible to avoid the possibility of the underside 58a of the transmission case 58 becoming an obstacle to cultivated soil Gr12. Therefore, the cultivated soil Gr12 can be reliably prevented from heaping in front of the transmission case 58. Thus, it is possible to prevent the transmission case 58 from running on piled-up soil, so that resistance to travel of the working machine 10 can be minimized. Because unbalanced traveling resistance can be avoided, it is possible to effectively lessen loads on the human operator in keeping desired linear traveling performance of the machine 10.

Furthermore, because the underside 58a of the transmission case 58 is flat and inclined in the rearward and downward direction relative to the ground surface to be cultivated, the working machine 10 can appropriately level the cultivated soil Gr12 with the underside 58a of the transmission case 58, thereby achieving an enhanced the cultivating finish. Besides, because the underside 58a of the transmission case 58 is generally parallel to the ground surface Gr1 and inclined in the rearward and downward direction, the working machine 10 can readily get over cultivated and piled-up soil when the transmission touches the piled-up soil.

The following paragraphs further describe the behavior of the working machine 10, with reference to FIGS. 2, 5, 14 and 15.

As shown in FIG. 2, the engine 20 employed in the working machine 10 is a vertical engine with its output shaft 21 projecting downward, which therefore has a much smaller width than the conventional counterparts. The main clutch mechanism 30 also functions as the power transmission mechanism for transmitting the power of the engine 20 to the transmission mechanism 50. Because the main clutch mechanism 30 is composed of a combination of the planetary-gear speed reduction mechanism and brake, the output shaft 21 of the engine 20 and input shaft 51 of the transmission mechanism 50 can be interconnected coaxially in vertical alignment with each other, and the clutch case 34 can be reduced in height, i.e. can be formed into a low profile. Further, the main clutch mechanism 30, functioning as the power transmission mechanism, does not project in the widthwise direction of the working machine (direction intersecting the sheet of FIG. 2). In addition, the transmission case 58 can be formed into a relatively great dimension in the front-and-rear direction of the machine 10 but a much smaller dimension in the widthwise direction of the machine 10.

Because of the small width of the transmission case 58, the left and right transporting wheels 11, denoted by imaginary lines in FIG. 5, can be positioned closer to or farther from the widthwise center CL of the machine body, as necessary. Therefore, the distance between the left and right transporting wheels 11, disposed near opposite sides of the rear end portion of the transmission case 58 can be significantly reduced, as a result of which the working machine 10 can be reduced in width.

Figure 14:
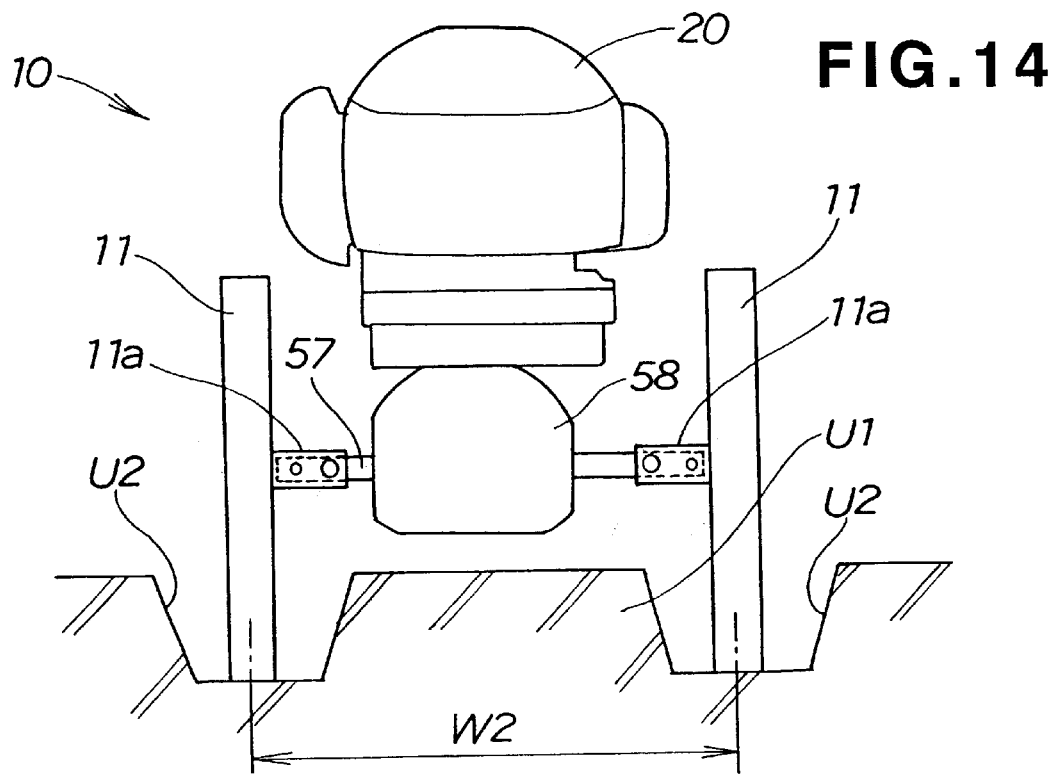
FIG. 14 is still another view explanatory of behavior of the front-rotary working machine.

FIG. 14 is another view explanatory of behavior of the front-rotary working machine 10, which particularly shows a case where the machine 10 performs ordinary cultivating operations with the left and right transporting wheels 11 set to be spaced apart from each other by a conventional distance W2 and placed on two furrows U2 across a ridge U1 so as to cultivate the ridge U1.

Figure 15:
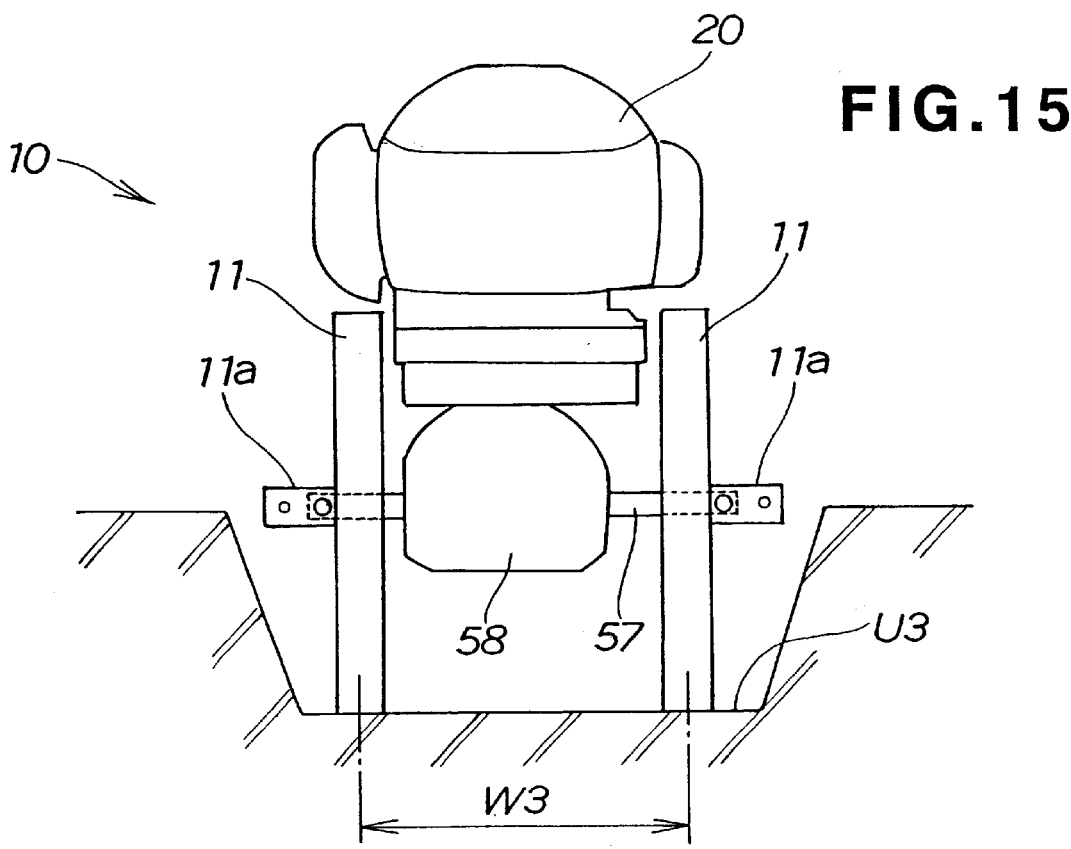
FIG. 15 is still another view explanatory of behavior of the front-rotary working machine.
Figure 16:
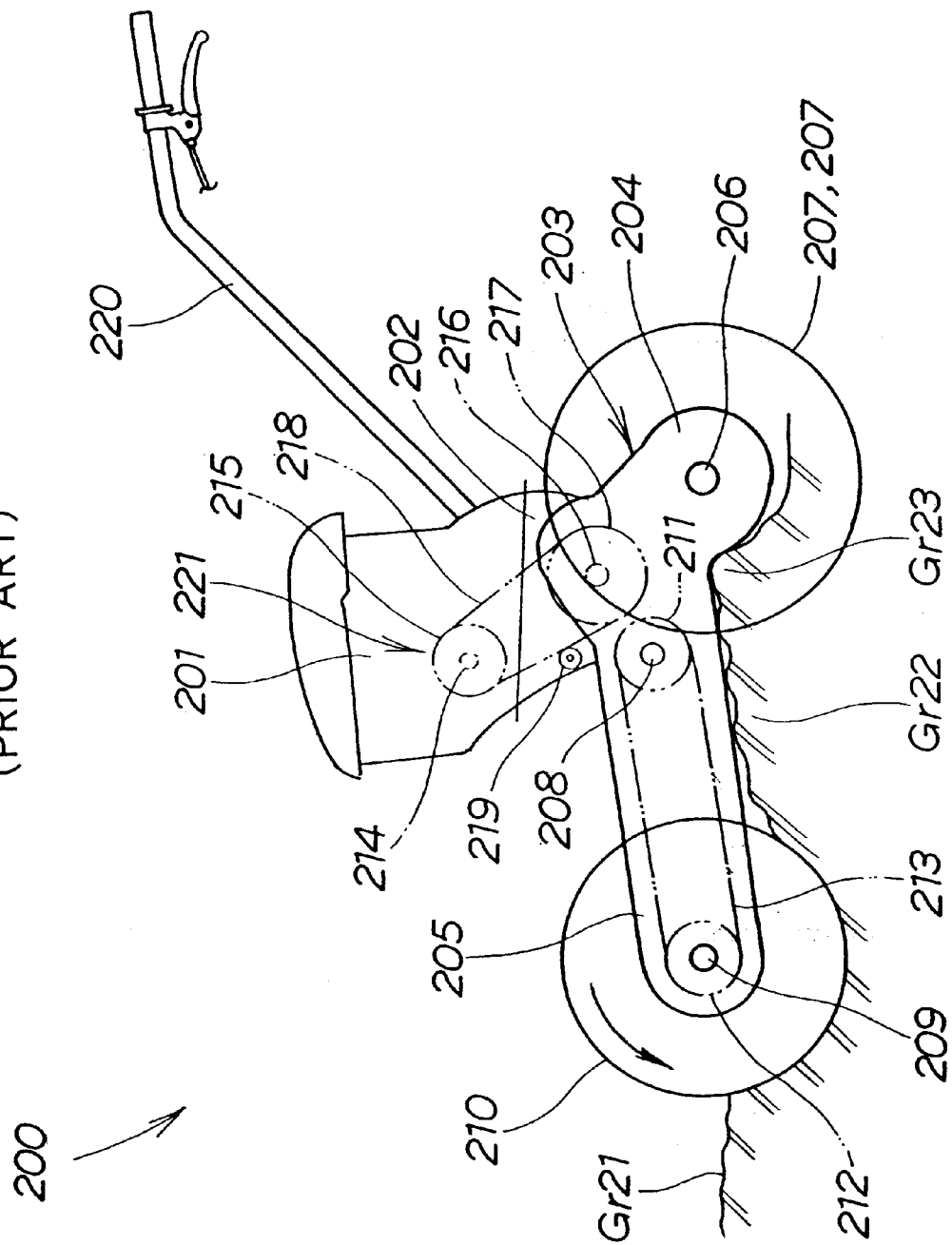
FIG. 16 is a schematic view of the conventional front-rotary working machine.

FIG. 15 is still another view explanatory of behavior of the front-rotary working machine 10, which particularly shows a case where the machine 10 performs cultivating operations in a narrow space, such as single furrow U3, with the left and right transporting wheels 11 set to be spaced apart from each other by a distance W3 much smaller than the conventional distance W2 and placed on the furrow U3 so as to execute weeding operations on the furrow U3. In this case, the working machine 10 can be readily positioned on the narrow furrow U3 to work on the narrow furrow U3 while traveling therealong, so that it is possible to enhance the operability of the working machine 10 in the narrow space.

For example, the distance between the left and right transporting wheels 11 can be adjusted by changing axial positions, on the axle 57, of hubs 11a of the transporting wheels 11, as clearly seen from FIG. 14 and FIG. 15. In the case where the distance between the left and right transporting wheels 11 is reduced as illustratively shown in FIG. 15, the third and fourth cultivating claw groups 133 and 134 may be removed from the cultivating shaft assembly.

With the adjustability of the distance between the left and right transporting wheels 11, the single working machine 10 can perform cultivating operations in a narrow space as shown in FIG. 15 as well as ordinary cultivating operations as shown in FIG. 14.

The present invention arranged in the above-described manner can afford the following benefits.

Even when soil cultivated by the rotary working unit has heaped to a considerable height, the front-rotary working machine of the present invention can prevent the transmission case from undesirably interfering with the heaped soil, and avoid the prior art problem that the heaped soil is undesirably shaved by the underside of the transmission case. As a result, the front-rotary working machine of the invention can ensure a superior cultivating finish. Further, present invention can reliably prevent cultivated soil from heaping in front of the transmission case. Thus, it is always possible to prevent the transmission case from running on piled-up soil, so that resistance to travel of the working machine can be minimized. Because unbalanced traveling resistance can be avoided in this way, it is possible to effectively lessen loads on a human operator in keeping desired linear traveling performance of the machine.

Furthermore, the use of the vertical engine with its output shaft projecting downward can reduce the width of the working machine to a significant degree. Because the transmission case is disposed beneath such a vertical engine, the power transmission mechanism for transmitting power from the engine to the transmission system does not project in the widthwise direction of the working machine. Further, with the transmission case having a relatively great dimension in the front-and-rear direction of the working machine and a relatively small dimension in the widthwise direction of the working machine, the width of the working machine can be reduced even further. With these arrangements, the distance between the left and right transporting wheels can be reduced, which can thereby reduce the overall width of the front-rotary working machine. Thanks to these advantages, the working machine can be readily positioned on a narrow furrow to work on the narrow furrow while smoothly traveling therealong, and thus it is possible to greatly enhance the operability of the working machine in narrow-space operations, such as weeding operations on furrows.

The transmission case, having an increased great dimension in the front-and-rear direction of the working machine, can have a reduced height or lower profile. The engine can be disposed closer to the upper surface of the transmission case and the ground surface. Because the center of gravity of the entire working machine can be thus lowered, it is possible to enhance the traveling stability of the front-rotary working machine.

The present disclosure relates to the subject matters of Japanese Patent Application Nos. 2002-008023 and 2002-008041, both filed Jan. 16, 2002, the disclosures of which are expressly incorporated herein by reference in their entireties.

What is claimed is:

1. A front-rotary working machine for performing work on a ground surface, comprising:
   an engine;
   a transmission case disposed below the engine;
   front and rear driving shafts operatively connected to the engine and projecting from front and rear portions, respectively, of the transmission case;
   transporting wheels disposed rearwardly of the engine and being driven by the rear driving shaft; and
   a rotary working unit having an axis of rotation disposed forward of the engine and being driven by the front driving shaft;
   wherein the transmission case has a generally flat bottom surface disposed above the axis of rotation of the rotary working unit and extending substantially parallel to a ground surface on which the working machine performs work.

2. A front-rotary working machine according to claim 1; wherein the bottom surface of the transmission case has a front portion gradually inclining downwardly in a rearward direction of the working machine with respect to the ground surface, and a rear portion contiguous with a rear end of the front portion and extending parallel to the ground surface.

3. A front-rotary working machine according to claim 2; wherein a straight line passing through an axis of rotation of an output shaft of the engine and a straight line passing through an axis of rotation of the front driving shaft form an angle of about 60°.

4. A front-rotary working machine according to claim 3; wherein the front portion of the underside of the transmission case has an inclination angle of about 5° relative to the rear portion.

5. A front-rotary working machine according to claim 2; wherein the front portion of the underside of the transmission case has an inclination angle of about 5° relative to the rear portion.

6. A front-rotary working machine according to claim 1; wherein the engine is vertically disposed and has a crankshaft oriented in a vertical direction of the working machine, and the front driving shaft is disposed below the crankshaft and connected to undergo rotation with the crankshaft to drive the rotary working unit.

7. A front-rotary working machine according to claim 6; wherein the engine and the transmission case are vertically disposed along a widthwise central axis of the working machine, and a width of the transmission case in the widthwise direction of the working machine is less than or equal to that of the engine body.

8. A front-rotary working machine according to claim 1; wherein a straight line passing through an axis of rotation of an output shaft of the engine and a straight line passing through an axis of rotation of the front driving shaft form an angle of about 60°.

9. A front-rotary working machine according to claim 1; further comprising a clutch mechanism interposed between the engine and the transmission case.

10. A front-rotary working machine according to claim 9; wherein the clutch mechanism comprises a sun gear mounted to undergo rotation with an output shaft of the engine and being coaxially aligned therewith, a planetary gear assembly meshingly engaging the sun gear, a cylindrical inner gear meshingly engaging the planetary gear assembly, a clutch case accommodating the sun gear, the planetary gear assembly and the inner gear and being connected at one end to the engine and at an opposite end to the transmission case, a plurality of ball bearings interposed between the cylindrical inner gear and the clutch case for rotatably supporting the cylindrical inner gear, and a brake for selectively locking or unlocking the cylindrical inner gear.

11. A front-rotary working machine according to claim 10; wherein the planetary gear assembly comprises a plurality of planetary gears meshingly engaging the sun gear and the cylindrical inner gear, and a planet frame rotatably supporting the planetary gears and having at a center thereof a joint spline-coupled to an input shaft of the transmission case to transfer rotation of the engine to the transmission case.

12. A front-rotary working machine according to claim 11; wherein the inner gear comprises a planar gear section meshingly engaging the planetary gears and a cylindrical drum section extending from the gear section and against which the brake is pressed to selectively lock or unlock the inner gear.

13. A front-rotary working machine according to claim 12; wherein the brake comprises a pair of brake shoes having pads on one surface thereof, an anchor pin fixedly attached to one end of the brake shoes for retaining the one end of the brake shoes to the clutch case, an actuating pin at another end of the brake shoes for selectively displacing the brake shoes toward and away from each other to press against an inner surface of the cylindrical drum section of the inner gear, a lever connected to the actuating cam, and a cable coupled at one end to the lever and at another end to a manually-operated clutch lever.

14. A front-rotary working machine according to claim 13; wherein the brake further comprises return springs for urging the brake shoes toward each other the cylindrical inner gear to be freely rotatable with the sun gear when the brake is unlocked.

15. A front-rotary working machine according to claim 14; wherein the planet frame undergoes rotation with the sun gear when the brake is locked to cause the input shaft of the transmission to undergo rotation therewith via the joint.

16. A front-rotary working machine according to claim 15; wherein the input shaft of the transmission is coaxially aligned with the output shaft of the engine.

17. A front-rotary working machine comprising:
a vertical engine having an engine body, and an output shaft projecting downward from the engine body;
a transmission case disposed below the vertical engine so that the transmission case has a larger dimension in a front-and-rear direction of the working machine than in a widthwise direction of the working machine, the transmission case having a plurality of intermediate shafts extending horizontally in the widthwise direction of the working machine and being arranged in succession along the front-and-rear direction of the working machine;
a drive shaft projecting laterally from opposite sides of a rear end portion of the transmission case;
left and right transporting wheels respectively connected to opposite end portions of the drive shaft; and
a rotary working unit disposed in front of the transmission case.

* * * * *